UNITED STATES PATENT OFFICE.

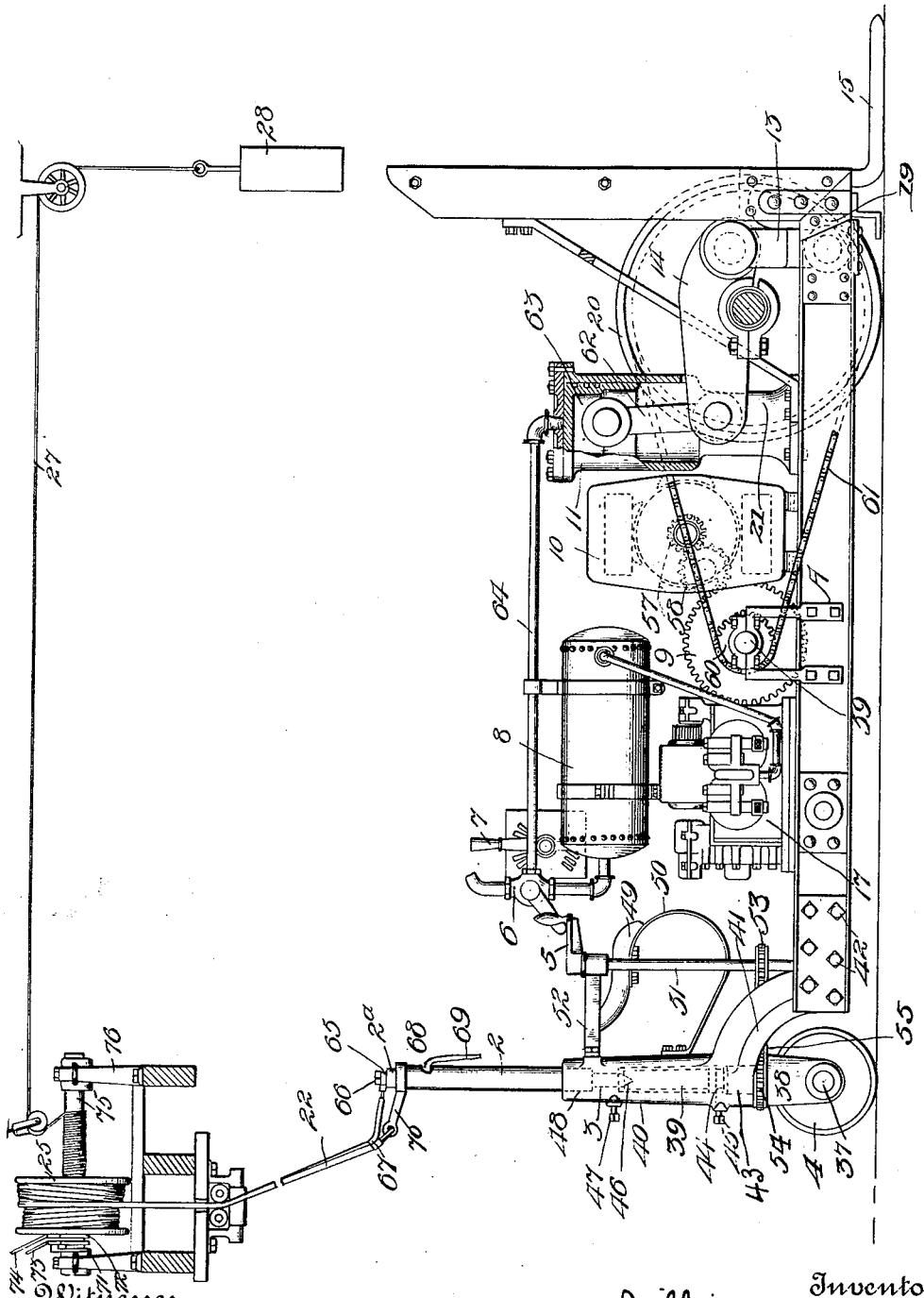

WILLIAM L. SMITH, OF COLUMBUS, OHIO, ASSIGNOR, BY MESNE ASSIGNMENTS, TO THE JEFFREY MANUFACTURING COMPANY, A CORPORATION OF OHIO.

ELECTRIC VEHICLE AND CABLE-REELING MECHANISM THEREFOR.

1,045,903.      Specification of Letters Patent.      Patented Dec. 3, 1912.

Application filed August 7, 1907. Serial No. 387,554.

*To all whom it may concern:*

Be it known that I, WILLIAM L. SMITH, citizen of the United States, residing at Columbus, in the county of Franklin and State of Ohio, have invented certain new and useful Improvements in Electric Vehicles and Cable-Reeling Mechanism Therefor, of which the following is a specification, reference being had therein to the accompanying drawing.

The object of my invention is to provide an improved means for transmitting power to a freely movable vehicle from a fixed source of current supply. In accomplishing this object I provide a flexible conductor cable connected at one end to the vehicle and a stationary reel adapted to wind and unwind the cable as the vehicle moves.

In order to make the invention more clearly understood there is shown in the accompanying drawings means for carrying it into practical effect, without limiting the improvements, in their useful applications, to the particular construction which, for the sake of example, is illustrated.

The drawing shows a side view of an apparatus embodying the invention. One of the front wheels and the parts associated with it are broken away for the sake of clearness.

The particular truck or vehicle which I have shown does not constitute a part of my present invention, and a very brief description of it will therefore be sufficient.

The vehicle shown comprises a main frame A supported at one end upon a steering wheel 4 and suspended at the other end from an axle which is supported upon driving wheels 20.

37 is the axle of the steering wheel mounted in side bearing flanges 38, the latter being united above the wheel with a vertical spindle 39. This spindle is inclosed in a vertical bearing 40 having side braces or plates 41 which are bolted at 42 to the rear ends of the frame bars 18. The lower part 43 of the spindle is cylindrical and has a working fit in the bearing 40, and is formed with a peripherial groove 44 into which projects the end of a screw 45, extending through the lower part of the bearing 40. The upper part of the spindle is smaller than the inclosing space of the bearing 40, has a conical, concave bearing seat 46 in its upper end and is engaged in such seat by a step-bearing cone-pointed screw 3 which is screwed and is vertically adjustable in the bearing 40. 47 is a set screw, screwed through said bearing and engaging the screw 3 to hold it in place after adjustment. In the upper end of the bearing 40 is a seat 48 in which is fixed the electric current collecting mast 2.

49 is the driver's seat mounted on a spring 50 secured to the bearing 40. The spindle with its steering wheel is turned to steer the machine by a crank handle 5 on a shaft 51. This shaft is mounted at its lower end in a suitable bearing on the frame, and at its upper part in a bearing bracket 52, and carries a sprocket 53 through which, and a sprocket 54 on the spindle 39 and a connecting chain 55, the spindle may be turned.

10 is an electric motor carried on the vehicle frame A, and having a driving pinion 57. This pinion drives an intermediate gear 58, and the latter a compensating gearing 9, on a driving shaft 59. The two parts of this shaft are connected by the compensating gearing, and each has fixed on it a sprocket 60. Each sprocket is connected with one of the front driving wheels 20 by a chain 61 and a sprocket attached to the driving wheel.

At one end of the vehicle there is a vertically adjustable carrier frame 15 which can be controlled through the link 13, the lever 14 and the connecting rod 62 by means of the piston 63 in the cylinder 11. Air can be supplied to the cylinder 11 through the pipe 64 from the reservoir 8. Air is supplied to the reservoir by means of the electrically actuated compressor indicated as an entirety by 17. An exhaust valve 6 is provided through which the pressure within the cylinder 11 can be released to permit the frame 15 to be lowered.

The electric motors on the vehicles are supplied with current through the cable 22 which is mechanically supported upon parts above described at the driver's end of the machine, and is electrically connected to the motor circuit on the vehicle. The collecting post 2 has a casing 2ᵃ preferably consisting of a metallic tube. In the upper part of this tube there is an insulator or plug 65. Through the center, vertically, of this insulator passes the conducting bolt or rod 66 which at its upper end is electrically connected to the terminal 67 of the cable, and at its lower end, inside of the casing 2ª, is electrically connected to the terminal 68 of the cable or conductor 69 which supplies the motor circuit. To give a firm mechanical support for the cable use is made of a crane arm 70 secured to the upper end of the casing 2ª and extending out sufficiently far to a point where it can be properly attached to the cable, as shown in the drawing.

The cable 22 is of indefinite length extending from the top of the mast or post 2 to the reel 25. This is mounted upon a suitably placed support, preferably one in an elevated position, and is so mounted and has combined with it parts such that it can be automatically turned in either direction for winding the cable on the one hand and permitting it to be unwound, on the other. The inner terminals of the cable are electrically connected in any suitable way with brush rings 71, 72, the brushes of which are connected by conductors 73, 74, with the supply mains. The reel 25 is secured to shaft 75, which is mounted in the standard 76. 28 is a weight attached to one end of the cord 27, and the latter, at its other end, is secured to the said shaft 75 or suitably connected to the reel so as to cause the shaft 75 to rotate, when permitted by the vehicle, such turning of the shaft resulting in a winding up of the cable 22 upon the reel. The weight 28 is so related to the weight of the cable, and the other factors which oppose the weight, that it shall exert constantly its tendency to wind the cable.

The manner of using a vehicle of the character described will be readily understood. Suppose, for example, that it is designed for use as a charging truck in an annealing furnace; that is, a truck adapted to carry an annealing pot or tier of pots to the furnace, and thereafter to lift the pot or tier of pots while in the furnace, withdraw them, and transport them to another point. If one or more such pots are ready to be placed in the furnace, the motorman, by means of the switch and controller at 7, admits current to the motor circuits and thereupon the motor 10 commences to propel the vehicle through the chains 61 and the sprockets 21 and by the devices at 5, 51, 53, 54, and 55, he steers the vehicle so that as it approaches the pots the support 15 will pass under the base thereof. After the truck has reached its load and engaged therewith the motorman admits air from the tank 8 into the cylinder 11. This forces downward the piston 63 and piston-rod 62, which causes the lever 14 to lift the support 15. Then the truck is taken to the furnace, the pots are introduced and after they reach their rests or supports, the valve at 6 is thrown so as to open the exhaust to the atmosphere, whereupon the support 15 moves downward, away from the pots, and thereafter the truck is reversed and the operation repeated.

What I claim is,—

1. In a truck of the class described, the combination of the main frame, the rear supporting and driving wheels, the front supporting and steering wheel, the vertical spindle therein, the bearing of the said spindle, the electric motor on the vehicle, power transmitting gearing interposed between the motor and the rear driving wheels, a mast carried by the said spindle bearing, and a flexible current conductor secured to the said mast and adapted to supply electric current to the motor.

2. In a movable truck, the driving wheels, the main frame, the steering wheel, the supporting frame for the steering wheel pivoted to the main frame on a vertical axis, the electric motor on the truck, power transmitting gearing interposed between the motor and the driving wheels, a flexible conductor mechanically secured at one end to the moving vehicle and adapted to supply current to the motor and at the other end electrically connected to a fixed supply conductor, means for taking up the slack in the cable, and guiding devices for the cable adapted to guide the cable vertically therethrough and to permit it to approach and recede therefrom in any direction horizontally.

3. The combination of the truck, movable in all directions horizontally and having thereon steering devices and an electric motor adapted to propel it, with the stationarily mounted reel, the flexible conductor secured at one end to the reel and adapted to be wound thereon and at the other end to the truck and electrically connected at the reel end to a fixed supply conductor and at the other end to the motor, and means for applying a torque at all times to the reel sufficient to maintain the conductor taut under all conditions.

4. The combination with the truck, movable horizontally in all directions and having thereon steering means and an electric motor adapted to propel it, the reel, the stationary mounting therefor, the fixed supply conductor, the flexible conductor connected at one end to the vehicle and adapted to supply current to the motor and connected at the other end to, and adapted to be wound upon the reel and electrically connected to the fixed supply conductor, the stationary roller mounting devices, and the stationary guide rollers for the flexible conductor on the said mounting devices in horizontal planes above the top horizontal plane of the vehicle.

5. The combination of a vehicle movable in all directions, an electric motor on the vehicle for propelling it, a conductor cable secured to the vehicle at one end and electrically connected to the motor at that end, a reel mounted in a stationary position upon which the other end of the cable is wound, current collecting devices for connecting the reel end of the cable with a stationary electric conductor, a winch drum connected with the reel, a rope wound upon the winch drum, and a weight secured to the free end of the rope and adapted to apply torque to the conductor cable and to wind up the cable whenever the movement of the vehicle will permit it.

6. The combination of a moving vehicle, an electric motor upon the vehicle for propelling it, a reel stationarily mounted at a point above the vehicle and under which the vehicle can freely pass, a flexible conductor cable secured to the vehicle and electrically connected to the motor at one end and wound upon the reel and electrically connected to a stationary conductor at its other end.

7. The combination of the truck, movable in all directions horizontally and having thereon steering devices and an electric motor adapted to propel it, with the stationarily mounted reel and the flexible conductor secured at one end to the reel and adapted to be wound thereon and at the other end to the truck and electrically connected at the reel end to a fixed supply conductor and at the other end to the motor.

8. The combination of a moving vehicle, an electric motor upon the vehicle for propelling it, a stationarily mounted reel, a flexible conductor cable secured to the vehicle and electrically connected to the motor at one end and wound upon the reel and electrically connected to a stationary conductor at its other end.

In testimony whereof I affix my signature, in presence of two witnesses.

WILLIAM L. SMITH.

Witnesses:
CURTIS C. MARSHALL,
CHAS. B. HAYS.